March 28, 1944.    D. E. WILLIAMSON    2,345,022
TRACER MECHANISM
Filed Feb. 29, 1940    2 Sheets-Sheet 1
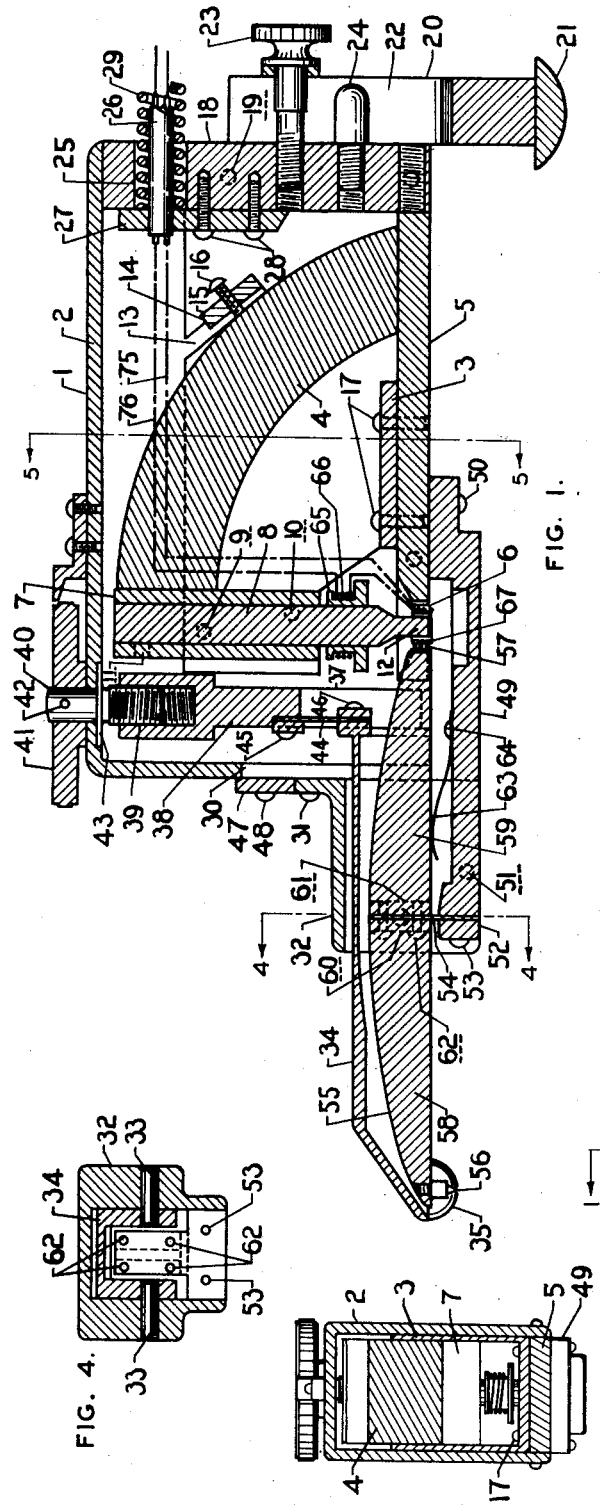
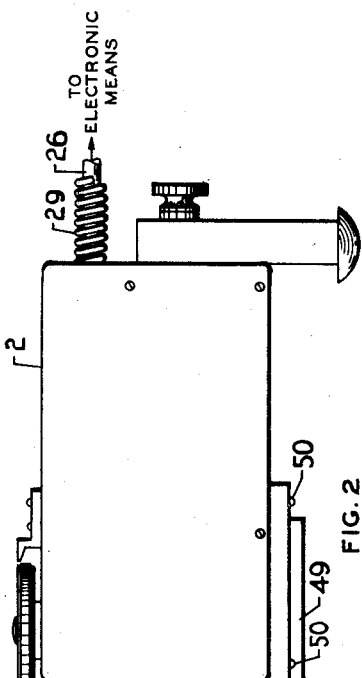
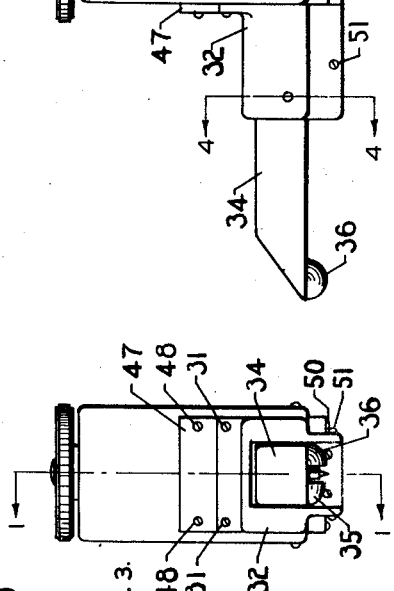
INVENTOR
D. E. WILLIAMSON
BY Roy A. Plant
ATTORNEY March 28, 1944.  D. E. WILLIAMSON  2,345,022
TRACER MECHANISM
Filed Feb. 29, 1940  2 Sheets-Sheet 2
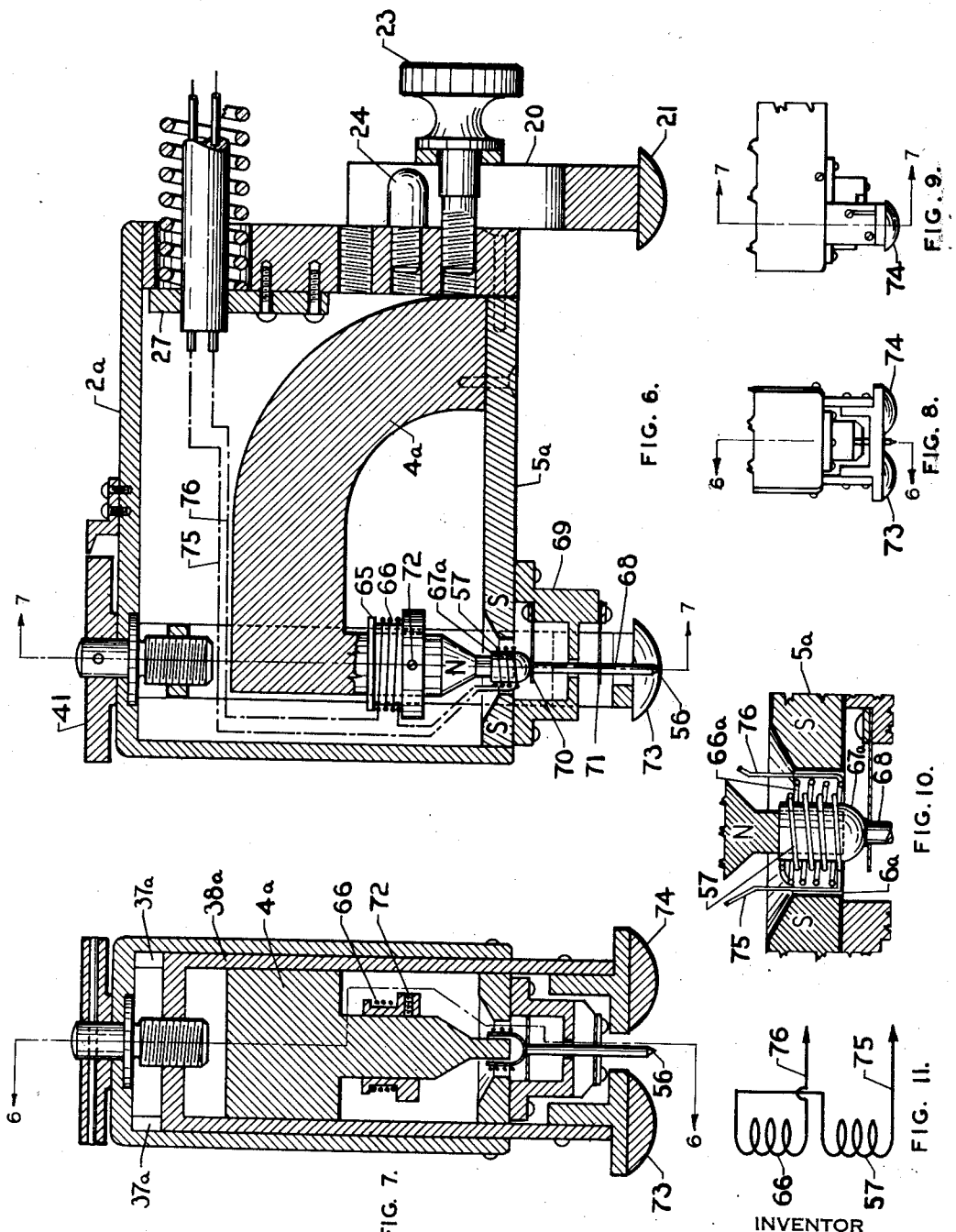
INVENTOR
D. E. WILLIAMSON
BY Roy A. Plant
ATTORNEY Patented Mar. 28, 1944

2,345,022

UNITED STATES PATENT OFFICE 2,345,022

TRACER MECHANISM

Donald E. Williamson, Ann Arbor, Mich.

Application February 29, 1940, Serial No. 321,531

11 Claims. (Cl. 73—51)

The present invention relates broadly to apparatus having parts which, when mechanically oscillated, cause the generation of electric voltage, and in its specific phases it relates to an improved tracer mechanism adapted for application to and movement over a surface whose roughness is to be investigated.

Surface roughness, prior to the invention by E. J. Abbott of the surface roughness measuring instrument now commercially known as the "Profilometer," was commonly determined or classified by drawing one's finger nail across the specimen, or through direct visual examination made by various persons having more or less experience in this field. The results thus obtained were non-comparable due to the lack of fixed uniform standards of comparison.

The patent application filed by E. J. Abbott, September 9, 1936, and carrying Ser. No. 100,030, describes in broad terms the principles and mechanical features embodied in the "Profilometer." That instrument made comparison of surface roughness by fixed uniform standards an actuality. Continued work in the field resulted in the invention by E. J. Abbott of an improved tracer mechanism which is of simplified construction as well as more versatile, stable, and accurate than the specific forms of tracer mechanism set forth as part of the combination in patent application Ser. No. 100,030. Such improved tracer mechanism is described in patent application Ser. No. 310,889, filed December 26, 1939. While that tracer mechanism is suitable for a wide range of use, it is not adapted for use in measuring the surface roughness of the inside of small openings or restricted places without cutting the specimen. I have also found that the electric output of that tracer mechanism under conditions of actual surface measurement use may be spurious and inaccurate when the tracer mechanism is used at a point where there is an extraneous alternating magnetic field or fields produced by nearby electric motors, electric generators, electric transformers, wiring, or the like.

Accordingly, among the objects of the present invention is the provision of an improved apparatus having parts which, when mechanically oscillated, generate electric voltage, and yet the voltage thus generated is substantially unaffected by extraneous alternating magnetic fields which may be encountered under operating conditions.

Another object is to provide a tracer assembly adapted for use in investigating the surface roughness of moderately small sized openings without requiring that same be cut open for investigation.

A further object is to provide a tracer assembly containing a tracer point, skids which act to determine a reference surface, means for converting the mechanical movements of the tracer point relative to the reference surface into electrical voltages which may be measured, and a member which electrically acts to reduce or minimize the effect of extraneous alternating magnetic fields upon the electric voltage producing portion of the assembly so that the actual electrical output of the assembly will be a more accurate measure of the mechanical movements of the tracer point of the assembly relative to its reference surface.

A still further object is to provide a stationary neutralizing coil, connected in series with a movable coil in which electric voltage is generated due to its mechanical oscillation in a magnetic field, so as to reduce or neutralize the effect of extraneous alternating magnetic fields upon the electric voltage output of the assembly.

Further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In said annexed drawings:

Figure 1 shows a vertical sectional assembly of one form of the present invention as viewed along line 1—1 of Figure 3.

Figure 2 shows a reduced size side-elevation view of the assembly illustrated in Figure 1.

Figure 3 shows an end elevation view of the assembly as viewed from the left end of Figure 2.

Figure 4 shows a sectional assembly view as taken along line 4—4 of Figure 1.

Figure 5 shows a reduced size sectional assembly view as taken along line 5—5 of Figure 1.

Figure 6 shows a partially sectioned vertical assembly of a modified form of the present invention as viewed along lines 6—6 of Figures 7 and 8.

Figure 7 shows a sectional assembly view as taken along the lines 7—7 of Figures 6 and 9.

Figure 8 shows a fragmentary end view of the lower portion of the assembly as viewed from the left end of Figures 6 and 9.

Figure 9 shows a fragmentary side view of the lower portion of the assembly as viewed from right side of Figure 8.

Figure 10 shows a partially sectioned fragmentary view of a modified form of the electric coil assemblies of Figure 6.

Figure 11 shows a typical schematic wiring diagram for the electric circuit coils of the apparatus shown in Figures 1, 6, 7, and 10.

Referring more particularly to Figure 1 of the drawings, the tracer assembly 1 has a casing 2 preferably formed from non-magnetic material such as brass or a die-casting alloy. A substantially U-shaped frame 3 may be used inside of casing 2, and within this frame is placed a magnetic field-producing mechanism which in its simplest form consists of a permanent magnet 4. The magnet portion of the assembly may be of one piece construction. However, for simplicity of manufacture and assembly a multi-piece magnet assembly may be used to advantage. For instance, a bar magnet 4 of substantially arcuate shape as shown in Figure 1 may have the lower end thereof in contact with an extending arm 5 having an opening 6 therethrough. This opening is preferably beveled on its upper face as shown and also vertically slit at the end for purposes which will be hereinafter described. The upper end of the magnet may be in contact with a tubular member 7 and it in turn may contain an endwise movable rod-like core 8. The tubular member 7 may be anchored to frame 3 by means of screws 9 and 10, while core member 8 may be anchored against endwise movement in tubular member 7 by means of set screw 11. Extending arm 5, tubular member 7, and core 8 are formed of magnetic material and preferably soft iron. The lower portion of core member 8 is preferably reduced in size to provide a substantially straight lower end 12, with an upwardly tapering portion thereabove. In preferred construction the lower end 12 of core member 8 will extend substantially centrally of opening 6 in extending arm 5 and approximately to the bottom thereof, but with ample clearance therebetween. This type of construction with the beveled upper edge of opening 6 and tapered portion of core member 8 acts to concentrate the flow of magnetic flux across the substantially annular gap between core 8 and extending arm 5 at opening 6. The permanent magnet may be held against extending arm 5 and tubular member 7 in any convenient manner. One of the simplest ways of accomplishing this, consists of cutting a notch 13 with off-set portion 14 in the opposite side of U-shaped frame 3 and then placing a cross-bar 15, carrying a tightening screw 16, in said notch as shown, following which the tightening of screw 16 will hold the magnet in place. In preferred construction the extending arm 5 will be fastened to frame 3 by means of screws 17.

The back portion of the assembly is closed with a non-magnetic member 18 preferably in the form of a piece of brass. This member 18 may be fastened to the magnet assembly in any conventional manner and one suitable construction consists of using screws 19 for anchoring same to the sides of U-shaped frame 3 at the rear end thereof. A rear foot 20 with skid 21 may be used as a steadying member during the use of the assembly. For simplicity of adjustment the rear foot 20 is provided with a slot 22, which cooperates with a threaded stud 23, which threadedly engages member 18. A guide plug 24 may be used to hold rear foot 20 against pivotal movement about threaded stud 23. By using identical threading on threaded stud 23 and guide plug 24, as well as a plurality of like threaded openings in member 18 as shown, a wide range of adjustment of rear foot 20 is possible. The upper portion of non-magnetic member 18 is provided with an opening 25 through which extends a suitable wiring cable 26 which may be held in place by means of a clamp plate 27 and which in turn may be anchored to member 18 with screws 28 or the equivalent. To protect cable 26 from injury due to sharp bends at the point of exit from the tracer assembly 1, a conventional protecting spring 29 may be used and this in turn may be anchored in place in any suitable manner such as by welding to clamp plate 27.

The front end of casing 2 is cut away to form an opening 30 in which certain parts of the assembly may freely move as will be hereinafter described. Fastened over opening 30 by means of screws 31 is skid lever housing 32. Pivotally mounted on housing 32 by means of pivot pins 33 Figure 4 is a skid lever 34. This skid lever is preferably of inverted U-shape with skids 35 and 36 Figure 3 mounted on the under face of same at the outer end thereof. Casing 2 at the skid lever housing end is provided on its opposite inner side faces with ways 37 Figure 1 in which a vertical slide member 38 is adapted to be moved. The upper end of this slide member is vertically threaded and engaged by a suitably threaded member 39, which has an upwardly projecting shaft 40 extending through a suitable opening in the upper edge of casing 2 and has mounted thereon a graduated knob 41. This knob may be anchored in place on shaft 40 by means of a suitable pin 42 or the equivalent. An abutment member 43 mounted on shaft 40 within casing 2 may be conventionally used in cooperation with graduated knob 41 for holding shaft 40 against endwise movement. A short link of clock spring or phosphor bronze 44 may be used for joining slide member 38 to skid-lever 34 by means of screws 45 and 46, or the equivalent. The use of a short link of this nature as shown, and which, for instance, may be in the neighborhood of .010" in thickness permits flexing under adjustment of skid-lever 34 upon rotation of graduated knob 41 and yet permits skid-lever 34 to be held rigidly in adjusted position. If desired a removable plate 47 fastened to casing 2 by means of screws 48 (Figure 3) may be used to provide ready access to screw 45 for the tightening or removal of same.

Rocker support member 49 is fastened to the bottom of extending arm 5 and casing 2 by means of screws 50 (Figure 2) and to skid-lever housing 32 by means of screws 51. Mounted on the end of rocker support member 49 by means of a plate 52 (Figure 1) and screws 53 is upstanding spring member 54. This spring member is preferably made of thin sheet material such as a piece of clock spring or phosphor bronze. Joined to spring 54 is a rocker 55 which carries a tracer point 56 at the end thereof between skids 35 and 36. The other end of rocker 55 preferably extends through the slit in the end of extending arm 5 for free up and down rocking movement therein. Mounted on the end of rocker 55 by means of any suitable fastening agent such as cement or the like within opening 6 of extending arm 5 is a carrier member 67 on which is wound a coil of wire 57. Rocker 55 for simplicity of construction and mounting on spring 54 is preferably made from light-weight substantially flat strip members 58 and 59 provided with outwardly projecting flanges 60 and 61 adapted to be fastened to opposite faces of spring 54 by means of screws 62. In order to reduce inertia effect and weight while maintaining suitable rigidity, members 58 and 59 of rocker 55 are preferably made from "Duralumin." The responsiveness of rocker 55 which tends to return the rocker to normal position after displacement, and its natural oscillation period vary with the thickness of spring 54 other factors remaining constant. In other words a very thin spring 54 would cause the rocker to be much slower in its return to initial position after slight pivotal displacement and release. The period of natural vibration of the rocker would also be greater, and thus the decreased responsiveness of the rocker would reduce the accuracy with which tracer point 56 would follow the profile depressions and elevations of a surface, when same is drawn thereover under surface investigation conditions, unless the rate of trace was very slow. On the other hand if spring 54 is made relatively heavy the responsiveness of rocker 55 will be increased and its natural period of oscillation decreased so that more accurate following of the tracer point 56 over the surface being investigated can be attained. The difficulty involved, however, under these conditions is that the stiffer spring 54 resists up and down movement of tracer point 56 to a greater degree and in extreme cases may cause same to scratch the surface being investigated. Where rocker 55 is approximately two inches in length and spring 54 approximately one-quarter inch wide with a space of approximately one sixty-fourth inch between the lower edge of rocker 55 and the upper edge of rocker support member 49 where spring 54 is connected thereto, a convenient and relatively satisfactory thickness for the spring where same is made from phosphor bronze is in the range of .010" and .014". The responsiveness of rocker 55 may be greatly improved and its natural period of vibration shortened advantageously by making spring 54 slightly thinner, for instance, from phosphor bronze of a thickness in the range of .008" and .010", and then supplementing this spring with another mild tension spring 63 mounted on rocker support member 49 by means of screw 64. Spring 63 in this position will bear against the under face of rocker 55 between spring 54 and coil 57.

While there is no particular limitation as to the exact size of the tracer assembly, one which is very convenient to use, has a casing 2 which is approximately the size of a package of cigarettes. With this size of apparatus and where skids 35 and 36 are formed from sections of three-sixteenths inch diameter, polished spheres of cemented carbide, or other suitable material, and with the skid-lever of proportionate size, a hole of approximately one-half inch diameter and one inch depth may be readily investigated. The skid-lever, skids, and allied parts may, however, be reduced in size so that holes at least as small as three-sixteenth inch diameter and one-quarter inch deep may likewise be readily investigated. By using an elongated rocker, as shown, in the investigation of surface roughness, the up and down movement of tracer point 56 will be so small that for all practical purposes it may be considered as vertical straight-line movement. With the instrument properly adjusted as will be hereinafter fully explained, the movement of the tracer point over a surface being investigated will cause the tracer point to move up and down as it passes over the hollows and elevations of the surface profile. The up and down movement of the tracer point will rock rocker 55 and this will cause coil 57 to move in step with the tracer point so as to cut lines of magnetic flux with resultant production of electric voltage which may be amplified and used to measure or provide a means for measuring the roughness of the surface over which the tracer point is being drawn.

The investigation of surface roughness not infrequently requires that such work be carried on at a point where there is an extraneous alternating or pulsating magnetic field. Under these conditions this extraneous magnetic field will cause the generation of an electric voltage in coil 57 with the result that the voltage delivered by the instrument may be spurious and erroneous, so far as measurement of surface irregularities indicated by the movement of tracer point 56 is concerned. I have now found that the effect of such extraneous alternating or pulsating magnetic field can be reduced and substantially eliminated by means of a stationary coil placed in the same extraneous magnetic field and connected in series with movable coil 57 so that the voltage induced in the stationary coil will flow in the opposite direction to that induced by the same extraneous magnetic field in the movable coil. A simple way of accomplishing this, as is shown in Figure 1, involves the use of a non-magnetic coil form 65 on which is wound stationary coil 66. This coil is connected in series with movable coil 57, as shown in Figure 11. Connecting the movable coil 57 and the stationary coil 66 in series in this manner results in the generation of opposite direction voltage in the two coils and by balancing the size of same, the voltage generated in the stationary coil due to the alternating or pulsating extraneous magnetic field will substantially neutralize the voltage induced in the movable coil due to this same extraneous magnetic field. Under these conditions the voltage generated in movable coil 57 due to the oscillation of same in step with the up and down movement of tracer point 56 will be delivered from the assembly substantially unaffected by the extraneous magnetic field. While the invention is not limited thereto I prefer to mount stationary coil 66 and movable coil 57 so that they have a substantially common axis. Coil form 65 may be made of various non-magnetic materials, and while it does not have to be of a material having electric insulating properties I prefer to use a material of that nature and of the many plastics adapted for this purpose, the one known as "Lucite" is very satisfactory.

The neutralizing effect described in connection with the apparatus shown in Figure 1 is not limited to that specific type of tracer construction. Figures 6 and 7, for instance, show a modified construction tracer unit which has a casing 2a, magnet 4a, extending arm 5a, tracer point 56, tracer point carrying rod 68, mounting member 69, and springs 70 and 71 to which rod 68 is connected. A carrier member 67a on which movable coil 57 is wound, is connected to the end of rod 68 for oscillation in unison with the up and down movement of tracer point 56 as it is drawn over a surface being investigated. Stationary coil 66 wound on coil form 65 is here connected in series with movable coil 57 in the same manner as is shown in Figure 11. For simplicity of anchoring coil form 65 in place in the construction shown in Figures 1, 6, and 7 a set screw 72 may be used as shown.

The stationary neutralizing coil instead of being mounted above movable coil 57 may be mounted co-axial and concentric with same. Referring to Figure 10 stationary coil 66a is placed in opening 6a and preferably cemented in place on the periphery of such opening while leaving sufficient space for the oscillatory movement of movable coil 57 therethrough. This type of construction subjects the two coils to substantially identical lines of extraneous magnetic flux regardless of the orientation of the tracer assembly to such extraneous source of magnetism.

Skids 73 and 74 Figures 6, 7, 8, and 9 determine a reference surface relative to which tracer point 56 moves in an up and down direction when the adjusted assembly is slowly drawn over the surface being investigated. Skids 35 and 36 shown in Figure 3 likewise determine a reference surface relative to which tracer point 56 moves under conditions of actual operation.

In actual use the stationary coil 66 should have a very small or negligible impedance so that it will not absorb an appreciable amount of voltage generated in moving coil 57 due to operation of the tracer assembly. The number of turns of wire in stationary coil 66 should also be kept small in order to reduce inductance, since the latter may affect frequency response, damping, output voltage, or all three. On the other hand, the number of turns in the stationary neutralizing coil should not be kept too small, since in that case the addition or removal of a single turn of wire from the coil will affect a large percentage of change in neutralizing effect. By reducing the coil diameter, the number of turns thereon may be increased without materially increasing the length of the wire with its resistance effect and without greatly varying the neutralizing effect of the coil.

The following example gives the results of a series of tests carried on with apparatus involving a stationary coil 66 and movable coil 57 in position corresponding to that shown in Figure 6:

Outside diameter of carrier member
67a _____ inch__ .176
Diameter of wire used on coil 57 _____ do____ .002
Number of turns of wire on coil 57 _____ 40
Outside diameter of coil 57 _____ inch__ .185
Outside diameter of stationary coil 66__do____ .260
Diameter of wire used in stationary neutralizing coil 66 _____ inch__ .004

The two coils were connected in series, as shown in Figure 11, with the ends of the wires 75 and 76 connected to an amplifier, and meter, which enabled the resultant voltage in the two coils to be measured. The "extraneous" field was produced by a solenoid operating on 110 volt 60 cycle current. The solenoid, for test purposes, was placed at a distance of 36 inches from the tracer assembly, and the following readings, based on the number of turns of wire on stationary coil 66, were taken:

| Number of turns on coil 66 | Microvolts |
|---|---|
| 0 | 2.51 |
| 1 | 2.31 |
| 2 | 2.12 |
| 3 | 1.86 |
| 4 | 1.58 |
| 5 | 1.32 |
| 6 | 1.11 |
| 7 | .85 |
| 8 | .60 |
| 9 | .40 |
| 10 | .13 |
| 11 | .05 |
| 12 | .21 |
| 13 | .52 |
| 14 | .74 |

The data in the above table shows that the optimum number of turns on stationary coil 66 for substantially complete neutralization 98% is eleven, where the stationary and movable coils are of the size noted.

These and other tests conducted indicate that neutralization in excess of 95% may be easily attained with production work and that it is a simple matter to make the neutralization substantially complete 98% or better by testing each tracer unit and adding or removing one or two turns of wire if necessary from stationary neutralizing coil 66.

Where the tracer assembly is provided with my neutralizing means to take care of the affect of extraneous alternating magnetic fields, it may be taken with the associated electronic equipment to a point of use and satisfactorily operated regardless of the presence of electric motors, generators, or the like. To use the apparatus the vertical position of the skids adjacent the tracer point of the tracer assembly must be properly adjusted and in doing this it is essential that the adjustment be made within close limits and be suitable for the curvature of the particular specimen to be measured. If the tracer skids adjacent the tracer point project too far when they are placed on the surface to be investigated, the end or tip of the tracer point will fail to touch the surface and the tracer will not operate. On the other hand, if the skids are withdrawn too far, the tracer point will extend so that there is danger of its scratching the surface of the specimen, and in extreme cases, the tracer point may be broken. The proper adjustment of the skids may be readily made as follows: With the skids extended so that the tip of the tracer point does not touch the surface, the tracer assembly is rocked from side to side as the skids are slowly withdrawn or raised relative to tracer point 56 by turning knob 41 on the top of the tracer assembly 1. At first there is no movement of the movable coil 57 with respect to the magnet, and hence no voltage is generated in the coil so as to be indicated by the suitable associated electronic equipment. However, when the skids are withdrawn so that rocking the tracer brings the tracer point lightly in contact with the surface, there is a sudden "kick" of voltage shown by the associated electronic equipment due to the movement of the coil, and the skids can then be very nicely adjusted by noting where this "kick" first occurs. A micrometer adjustment of the knob 41 allows movement of the skids so as to cause a suitable initial deflection of the springs 54 and 63 (Figure 1) or springs 70 and 71 (Figure 6) which support the rod carrying the tracer point when the latter and the skids rest on the surface to be investigated. An initial deflection resulting in movement of the tracer point a distance of the order of .0002" from free position is suitable for ordinary work. With the tracer assembly thus adjusted it is drawn over the surface to be investigated with the skids and tracer point in contact therewith. The voltage generated in movable coil 57 due to its movement in step with the oscillation of tracer point 56 flows through wires 75 and 76 of cable 26 to an amplifier (not shown) or other point of use. The movement of the tracer assembly over the surface, for best results, should be relatively uniform and preferably at a rate between .05" and 1.0" per second.

Other modes of applying the principle of my invention may be employed instead of those explained, change being made as regards the mechanisms herein disclosed, provided the means stated by any of the following claims or the equivalent of such stated means be employed.

I therefore particularly point out and distinctly claim as my invention:

1. In a mechanism of the character described, the combination which comprises a tracer point, a holder for said tracer point, a mounting means for said holder, said mounting means including a resilient means connected to said holder, a coil of wire mounted on said tracer point holder for movement in unison with said tracer point, a coil of wire which is stationary relative to the portion of said mounting means which carries said resilient means, said coils being connected in series so as to produce opposing voltage when subjected to a common extraneous magnetic field, extending supporting means for said mounting means, and means for adjusting said tracer point and said extending supporting means relative to each other.

2. In a tracer mechanism for use in investigating surface irregularities, the combination which comprises a tracer point, a holder for said tracer point, a mounting means for said holder, said mounting means including a resilient means connected to said holder, a coil of wire mounted on said tracer point holder for movement in unison with said tracer point, a coil of wire which is stationary relative to the portion of said mounting means which carries said resilient means, said coils being connected in series so as to produce opposing voltage when subjected to a common extraneous magnetic field, extending supporting means for said mounting means, at least one rounded face skid adjacent said tracer point, said extending supporting means acting as a carrier for said skid, and means for adjusting said tracer point and rounded face skid relative to each other in a direction substantially parallel to the direction of movement of said tracer point.

3. In a mechanism of the character described, the combination which comprises a frame, a tracer point, a holder for said tracer point, a mounting means carried by said frame, a resilient means connecting said tracer point holder to said mounting means for resiliently holding said tracer point in place and controlling the direction of its movement, a coil of wire connected to said tracer point holder for movement in unison with said tracer point, a coil of wire which is stationary relative to said frame and which is connected in series with said movable coil of wire so as to produce opposing voltage when said coils are subjected to a common extraneous magnetic field, extending supporting means for said frame, and means for adjusting said tracer point and said supporting means relative to each other in a direction substantially parallel to the direction of movement of said tracer point as permitted by said resilient means.

4. In a tracer mechanism for use in investigating surface irregularities, the combination which comprises a frame, a tracer point, a holder for said tracer point, a mounting means carried by said frame, a resilient means connecting said tracer point holder to said mounting means for resiliently holding said tracer point in place and controlling the direction of its movement, a coil of wire connected to said tracer point holder for movement in unison with said tracer point, a coil of wire which is stationary relative to said frame and which is connected in series with said movable coil of wire so as to produce opposing voltage when said coils are subjected to a common extraneous magnetic field, extending supporting means for said frame, said extending supporting means including a slide member with at least one rounded face skid means on the end thereof adjacent said tracer point, and means for adjusting said tracer point and said rounded face skid means relative to each other in a direction substantially parallel to the direction of movement of said tracer point as permitted by said resilient means.

5. In a mechanism of the character described, the combination which comprises a tracer point, a holder for said tracer point, a mounting means for said holder, said mounting means including a resilient means connected to said holder, a magnetic field generating means, a coil of wire joined to said tracer point holder for movement in unison with said tracer point, said coil being located in the magnetic field of said magnetic field generating means, a coil of wire mounted in stationary position relative to said magnetic field producing means, said coils being connected in series so as to produce opposing voltage when subjected to a common extraneous alternating magnetic field, extending supporting means for said mounting means, and means for adjusting said tracer point and said supporting means relative to each other.

6. In a tracer mechanism for use in investigating surface irregularities, the combination which comprises a tracer point, a holder for said tracer point, a mounting means for said holder, said mounting means including a resilient means connected to said holder, a magnetic field generating means, a coil of wire joined to said tracer point holder for movement in unison with said tracer point, said coil being located in the magnetic field of said magnetic field generating means, a coil of wire mounted in stationary position relative to said magnetic field producing means, said coils being connected in series so as to produce opposing voltage when subjected to a common extraneous alternating magnetic field, extending supporting means for said mounting means, said extending supporting means including a slide member with a pair of rounded face skids mounted on the end thereof and at opposite sides of said tracer point, and threaded means for adjusting said tracer point and said slide member carried pair of rounded face skids relative to each other in a direction substantially parallel to the direction of movement of said tracer point as permitted by said resilient means.

7. In a mechanism of the character described, the combination which comprises a skid-lever, a skid-lever housing, a casing on which the skid-lever housing is mounted, pivot means for pivotally mounting said skid-lever to said skid-lever housing, one end of said skid-lever extending from said skid-lever housing into the inside of said casing while the free end of said skid-lever extends out of said skid-lever housing at the end thereof opposite to said casing, skid means mounted on the free end of said skid-lever, adjustable means mounted on said casing, means for connecting said adjustable means to the end of said skid-lever projecting within the casing, whereby adjustment of said adjustable means will move said skid-lever on its pivot mounting, a rocker beam, means for pivotally mounting said beam intermediate its ends to said skid lever housing, a tracer point mounted on the end of said rocker adjacent said skids, a coil of wire mounted on the other end of said beam, and a magnetic field generating means, the movement of said rocker being adapted to move said coil in said magnetic field in such manner as to generate electricity in said coil.

8. In a tracer mechanism for use in determining the dimensions of irregularities of surfaces, the combination which comprises a skid-lever, a skid-lever housing, a casing on which the skid-lever housing is mounted, pivot means for pivotally mounting said skid-lever to said skid-lever housing, one end of said skid-lever extending into the inside of said casing while the other or free end of said skid-lever extends a substantial distance out of said skid-lever housing at the end thereof opposite to said casing, skid means mounted on the free end of said skid-lever, adjustable means mounted on said casing, means for connecting said adjustable means to the end of said skid-lever projecting within the casing, said connecting means holding the parts connected in fixed relation such that adjustment of the adjustable means will move said skid-lever on its pivot mounting, a rocker beam, means for pivotally supporting said rocker beam, said pivot mounting being intermediate the ends of said rocker and spaced a substantial distance from the nearest end thereof, a coil of wire mounted in fixed position on one end of said rocker, a tracer point mounted on the other end of said rocker at a point adjacent said skids, and a magnetic field generating means, said coil being adapted for oscillatory movement in the magnetic field produced by said magnetic field generating means.

9. In a tracer mechanism for use in determining the dimensions of irregularities of surfaces, the combination which comprises a skid-lever, a skid-lever housing, a casing on which the skid-lever housing is mounted, pivot means for pivotally mounting said skid-lever to said skid-lever housing, one end of said skid-lever extending into the inside of said casing while the other or free end of said skid-lever extends a substantial distance out of said skid-lever housing at the end thereof opposite to said casing, skid means mounted on the free end of said skid-lever, adjustable means mounted on said casing, means for connecting said adjustable means to the end of said skid-lever projecting within the casing, said connecting means holding the parts connected in fixed relation such that adjustment of the adjustable means will move said skid-lever on its pivot mounting, a rocker beam, means for pivotally supporting said rocker beam, said pivot mounting being intermediate the ends of said rocker and spaced a substantial distance from the nearest end thereof, a coil of wire mounted in fixed position on one end of said rocker, a tracer point mounted on the other end of said rocker at a point adjacent said skids, a magnetic field generating means, said coil being adapted for oscillatory movement in the magnetic field produced by said magnetic field generating means, a coil of wire mounted in fixed position relative to said magnetic field generating means, and means for electrically connecting said coils in series, said connection and fixed position coil of wire cooperating so that when the movable coil and fixed position coil are subjected to an extraneous magnetic field, voltage generated in said fixed position coil due to said extraneous field will act to reduce or neutralize the effect of said extraneous field on the coil assemblies.

10. In a tracer mechanism for use in determining the dimensions of irregularities of surfaces, the combination which comprises a skid-lever housing, a skid-lever which is of substantially inverted U-section, a casing on which the skid-lever housing is mounted, pivot means for pivotally mounting said skid-lever to said skid-lever housing, one end of said skid-lever extending into the inside of said casing while the other or free end of said skid-lever extends a substantial distance out of said skid-lever housing at the end thereof opposite to said casing, a pair of spaced apart skids mounted on the under edge of the free end of said skid-lever, adjustable means mounted on said casing, means for connecting said adjustable means to the end of said skid-lever projecting within the casing, said connecting means including a relatively stiff but flexible member for holding the parts connected thereby in fixed relation such that adjustment of the adjustable means will move said skid-lever on its pivot mounting, a rocker beam, a rocker beam supporting means, a spring member for joining said rocker beam to said rocker supporting means in manner permitting limited oscillatory movement of said rocker beam, said spring means being joined to said rocker beam at a point intermediate the ends thereof and spaced a substantial distance from the nearest end, said rocker beam spring pivoting point being adjacent to the pivoting point of said skid-lever, a coil of wire mounted in fixed position on one end of said rocker, a tracer point mounted on the other end of said rocker at a point directly between the skids on the end of the skid-lever, a permanent magnet within said casing, said coil being adapted for oscillatory movement in the magnetic field between the poles of said permanent magnet, a coil of wire mounted in fixed position relative to said permanent magnet, and means for electrically connecting said coils in series, said connection and fixed position coil of wire cooperating so that when the movable coil and fixed position coil are subjected to an extraneous magnetic field, the voltage generated in said fixed position coil due to said extraneous field will act to reduce or neutralize the effect of said extraneous field on the coil assemblies.

11. In a mechanism of the character described, the combination which comprises a rocker beam, a pivot mounting for said rocker, said pivot mounting being intermediate the ends of said rocker and spaced a substantial distance from the nearest end thereof, means for supporting said pivot mounting, a tracer point, means for mounting said tracer point at one end of said rocker and with its point extending in a direction substantially tangent to the path of motion of said point about said pivot, means for generating electricity, at least part of said generating means being connected to said rocker, said generating means being adapted to generate electricity due to movement of said rocker under actuation of said tracer point, a pair of skids, said skids being adjacent to and at opposite sides of said tracer point, and supporting means for said skids, said supporting means for said skids being joined to said pivot mounting supporting means and adapted to permit said rocker to move under actuation of said tracer point.

DONALD E. WILLIAMSON